United States Patent
Horiguchi et al.

(10) Patent No.: US 6,442,208 B1
(45) Date of Patent: Aug. 27, 2002

(54) APPARATUS AND METHOD FOR TRANSMITTING DATA

(75) Inventors: Mari Horiguchi, Kanagawa; Naofumi Yanagihara, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/909,391

(22) Filed: Aug. 11, 1997

(30) Foreign Application Priority Data

Aug. 23, 1996 (JP) .............................................. 8-222658

(51) Int. Cl.$^7$ ............................ H04B 3/00; H04L 25/00; H04L 27/00

(52) U.S. Cl. ........................ 375/257; 375/222; 375/256; 370/235

(58) Field of Search ................................ 375/256, 257, 375/225, 219, 222, 295; 370/235; 341/61; 369/47

(56) References Cited

U.S. PATENT DOCUMENTS

| | | | | |
|---|---|---|---|---|
| 4,918,523 A | * | 4/1990 | Simon et al. ................ | 348/396 |
| 5,007,047 A | * | 4/1991 | Sridhar et al. ............... | 370/286 |
| 5,301,300 A | * | 4/1994 | Ritz ........................... | 710/129 |
| 5,446,861 A | * | 8/1995 | Idleman et al. ............. | 711/100 |
| 5,541,955 A | * | 7/1996 | Jacobsmeyer ............... | 375/222 |
| 5,686,963 A | * | 11/1997 | Uz et al. ..................... | 348/404 |
| 5,940,439 A | * | 8/1999 | Kleider et al. .............. | 375/225 |

FOREIGN PATENT DOCUMENTS

| | | |
|---|---|---|
| EP | 0 632 671 | 1/1995 |
| EP | 0 658 010 | 6/1995 |
| EP | 0 862 295 | 9/1998 |
| WO | 96/34477 | 10/1996 |

OTHER PUBLICATIONS

Lauderdale, J. et al.: "Using the Minimum Reservation Rate for Transmission of Pre–Encoded MPEG VBR Video Using CBR Service"; IEICE Transactions on Communications, JP, Institute of Electronics Information and Comm. Eng. Tokyo, vol. E79–B, No. 8, Aug. 1, 1996, pp. 1023–1029.

(List continued on next page.)

Primary Examiner—Stephen Chin
Assistant Examiner—Lenny Jiang
(74) Attorney, Agent, or Firm—Frommer Lawrence & Haug LLP; William S. Frommer; Joe H. Shallenburger

(57) ABSTRACT

DVD reproducing apparatus which transmits variable-bit rate data on a digital serial bus having a predetermined transmission rate. The DVD reproducing apparatus reproduces data from a record medium in accordance with a control signal to produce variable rate data. The data rate of the variable rate data is detected at predetermined intervals of time, a rate of transmission of the variable rate data is established in accordance with the detected data rate, and the variable rate data is transmitted in accordance with the established transmission rate. The DVD reproducing apparatus includes an MPEG decoder which MPEG decodes the reproduced data and which generates the control signal in accordance with amounts of data stored within various buffers, such control signal being utilized to control the reproduction of the data from the record medium. A receiver, e.g., a digital television, having an MPEG decoder therein receives the transmitted data and MPEG decodes the data, but such MPEG decoder does not generate a control signal similar to the previously generated control signal in order to prevent underflow/overflow of the memories therein. In another embodiment, the DVD reproducing apparatus does not include therein an MPEG decoder, but the receiving device's MPEG decoder, unlike the first mentioned embodiment, generates a control signal that is transmitted back to the DVD reproducing apparatus in order to prevent underflow/overflow of the memories within the receiving device's MPEG decoder.

48 Claims, 7 Drawing Sheets

OTHER PUBLICATIONS

Lauderdale, J. et al.: "A New Technique for Transmission of Pre–Encoded MPEG VBR Video Using CBR Service"; IEEE International Conference on Communications (ICC), US, New York, IEEE, Jun. 23, 1996, pp. 1416–1420.

Pancha, P. et al.: "Bandwidth Requirements of Variable Bit Rate MPEG Sources in ATM Networks", Proceedings of the Annual Joint Conference of the Computer and Communications Societies (Infocom), US, Los Alamitos, IEEE Comp. Soc. Press, vol. Conf. 12, Mar. 28, 1993, pp. 902–909.

Patent Abstracts of Japan, vol. 012, No. 474 (E–692), Dec. 12, 1988 & JP 63 191436 A (Fujitsu Ltd.), Aug. 8, 1988.

* cited by examiner

APPARATUS AND METHOD FOR TRANSMITTING DATA

BACKGROUND OF THE INVENTION

The present invention relates to apparatus and method for transmitting data and, more particularly, to apparatus and method for transmitting variable-bit rate data on a digital serial bus having a predetermined transmission rate. The invention also relates to apparatus and method for transmitting variable-bit rate data on a digital serial bus with means for pre-detecting the bit rate of intervals of the variable-bit rate to be transmitted.

As is known, various types of digital video-audio equipment, for example, DVD reproducing devices, digital VTRs, digital televisions, etc., are currently available for consumer use. Several such devices reproduce or receive digital video/audio signals, convert those signals into analog signals, and supply the analog signals to analog-type video/audio equipment. It is also generally desirable to supply from such equipment digital video/audio signals to, for example, a personal computer, a digital television receiver, or other type of digital device.

The communication system IEEE-1394 is a digital serial bus which has been proposed as a means for transmitting such digital video/audio signals between digital devices. Referring to FIG. 1 of the drawings, an exemplary block diagram of an IEEE-1394 system that includes an IEEE-1394 bus 901 and various digital devices 902–907 is shown. In the exemplary block diagram, the IEEE-1394 bus is coupled between a DVD reproducing apparatus 902, a digital VCR 903, a digital broadcasting receiver 904, a digital television receiver 905, a digital television receiver 906 and a personal computer 907. As shown, digital video/audio data is supplied from DVD reproducing apparatus 902 via the IEEE-1394 bus to digital television receiver 906, and digital video/audio data supplied from digital broadcasting 904 is supplied via bus 901 to digital television receiver 905. Given an IEEE-1394 bus with a transmission rate of, for example, 100 Mbps, and video/audio data is organized into "units" of data, then in accordance with IEEE-1394 standard, 4915 units of data can be transmitted during each 125 $\mu$sec transmission cycle of the bus. In accordance with this standard, the number of units transmitted corresponds to the bit rate of the signal to be transmitted. For example, to realize a communication speed of approximately 10 Mbps, which corresponds to the mean bit rate of a typical video signal, then approximately 1200 units are needed. However, to realize a communication speed of approximately 2 Mbps, which is the mean bit rate of an audio signal, then approximately 704 units are needed.

One limitation of the above discussed IEEE-1394 standard is that signals are transmitted only after their transmission rate (i.e., bit rate) is determined. However, DVD reproducing devices that employ MPEG encoders/decoders reproduce digital video/audio data at a variable rate and, thus, an IEEE 1394-bus previously has been unable to transmit variable rate data reproduced from such devices.

OBJECTS OF THE INVENTION

Therefore, it is an object of the present invention to provide an apparatus and method for transmitting digital video/audio data which overcome the shortcomings of the above described system.

Another object of the present invention is to provide apparatus and method which is operable to transmit variable rate digital video/audio data in accordance with the IEEE-1394 standard.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method are provided for detecting a data rate of variable rate data at predetermined intervals of time, establishing a rate of transmission of the variable rate data in accordance with the detected data rate, and transmitting in accordance with the established transmission rate the variable rate data on a transmission line that requires the transmission rate to be predetermined.

As one aspect of the present invention, a bandwidth of the transmission line that is required to transmit the variable rate data having the detected data rate is secured.

As a feature of this aspect, given a transmission line with a plurality of transmission cycles, the data rate of the variable rate data to be transmitted during each of the cycles is detected.

As another feature of this aspect, a new bandwidth is secured for each cycle of the transmission line in accordance with the detected data rate of the variable rate data to be transmitted during the respective cycle.

In accordance with another embodiment of the present invention, apparatus and method are provided for controlling the reproducing of a signal from a record medium in accordance with a control signal to produce a variable rate signal, processing the produced variable rate signal (e.g., by an MPEG decoder), generating the control signal in accordance with a condition of processing of the produced variable rate signal, and transmitting the variable rate signal on the transmission line.

As one aspect of this embodiment, the transmitted variable rate signal is received and processed in a similar manner as that of the produced variable rate signal (e.g., by a second MPEG decoder), but such second processing does not generate a control signal (similar to the earlier generated control signal) that represents a condition of the second processing.

In accordance with a further embodiment of the present invention, apparatus and method are provided for controlling the reproducing of a signal from a record medium in accordance with a control signal to produce a variable rate signal, transmitting from a transmission side the variable rate signal on the transmission line, receiving the variable rate signal transmitted on the transmission line, processing the received transmitted variable rate signal, generating the control signal in accordance with a condition of processing of the received transmitted variable rate signal, transmitting the generated control signal on the transmission line, and receiving at the transmission side the transmitted control signal, wherein the received transmitted control signal is utilized to control the reproducing of a signal from the record medium.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 2:
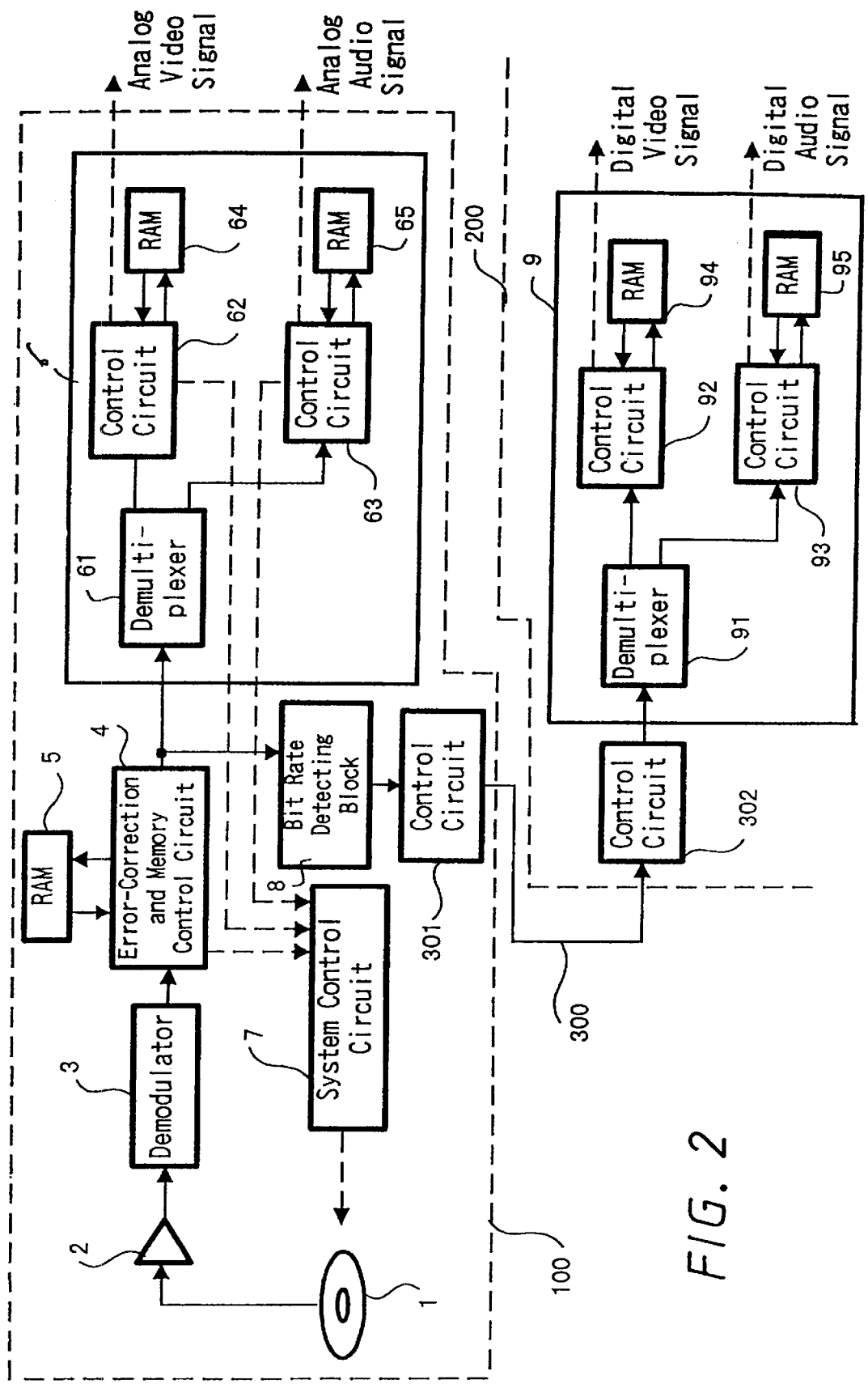
FIG. 2 is a block diagram of a data transmission apparatus in accordance with the present invention.
Figure 3:
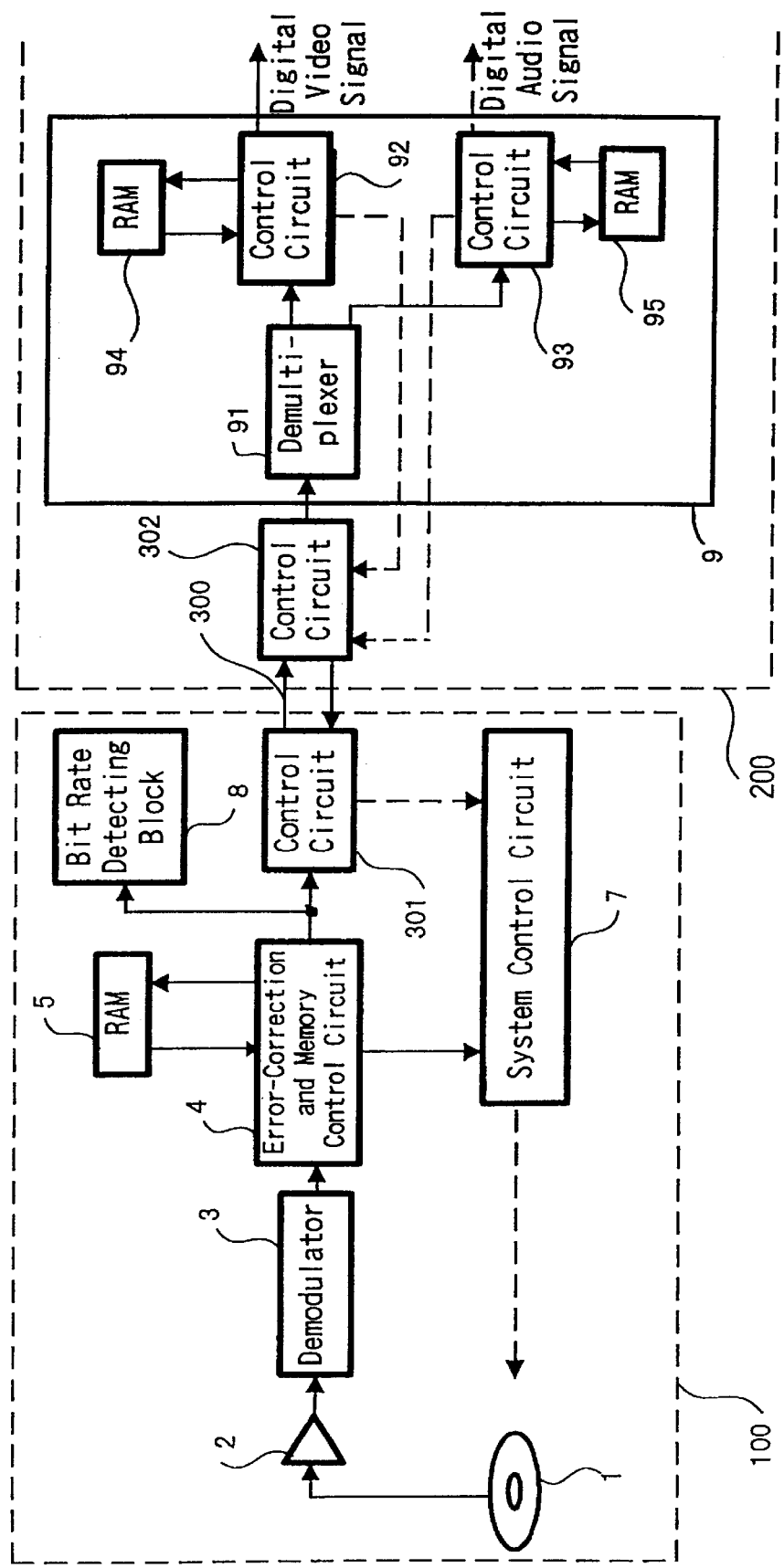
FIG. 3 is a block diagram of a data transmission apparatus in accordance with another embodiment of the present invention.

FIGS. 2 and 3 illustrate different embodiments of the data transmission apparatus of the present invention, wherein FIG. 2 illustrates a DVD reproducing apparatus 100 that includes an MPEG decoder 6, and FIG. 3 illustrates a DVD reproducing apparatus 100 that does not include an MPEG decoder. As will be discussed, DVD reproducing apparatus 100 shown in both FIGS. 2 and 3 are coupled via an IEEE-1394 digital serial bus 300 to an MPEG decoder 9, included in, for example, a digital television receiver.

Referring first to the embodiment of the present invention shown in FIG. 2, DVD reproducing apparatus 100 is operable to reproduce digital video/audio data from a digital video disk, decode the reproduced data in MPEG decoder 6, and supply the decoded data as respective analog video and audio signals. The analog video and audio signals may be supplied to, for example, an analog television receiver, an analog recording device, etc. DVD reproducing apparatus 100 further is operable to transmit the reproduced digital video/audio data via bus 300 to an external MPEG decoder 9 which decodes the transmitted signal and supplies digital video and audio signals as an output.

DVD reproducing apparatus 100 of the present invention reproduces digital video/audio data from a digital video disk in a reproducing device 1 which supplies the reproduced data via an amplifier circuit 2 to a demodulator 3 which demodulates the reproduced signal. The demodulated signal is supplied to an error correction and memory control circuit 4 which stores the supplied signal in a random access memory 5 and corrects errors in the stored signal in a known manner. The error corrected signal is supplied to MPEG decoder 6 which includes therein a demultiplexer 61, control circuits 62 and 63, and random access memories 64 and 65. The digital signal is supplied to demultiplexer 61 which demultiplexes the signal into its respective video and audio components. The video signal is stored via control circuit 62 in memory 64, and the audio signal is stored via control circuit 63 in memory 65. Control circuits 62 and 63 decode the respective stored video and audio signals in a known manner and the decoded video and audio signals are supplied as, for example, analog video and audio output signals (after digital to analog conversion).

In addition to decoding the stored video and audio signals, control circuits 62 and 63 supply to a system control circuit 7 respective control signals that identify the storage states of the respective memories 64, 65. Similarly, memory control circuit 4 supplies to system control circuit 7 a control signal that identifies the storage state of memory 5. These control signals are sometimes identified as memory occupation data and generally identify how much data is stored in the respective memories. System control circuit 7, in response to the supplied control signals, controls the reproduction of the digital video/audio data by the reproducing device 1 so as to, inter alia, prevent the underflow and/or overflow of the memories.

Figure 6:
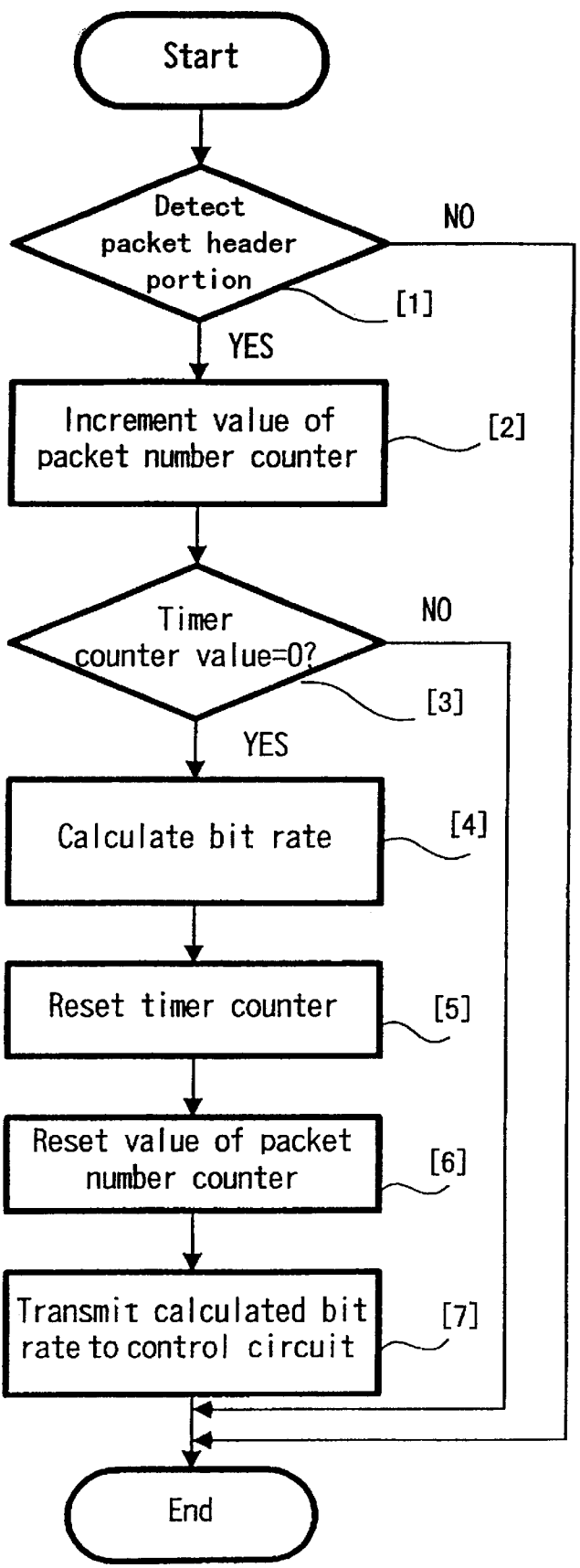
FIG. 6 is a flow chart of the operation of bit rate detecting block 8 in accordance with the present invention.

In accordance with the present invention, DVD reproducing apparatus 100 includes a bit rate detecting block 8 which detects the bit rate of the reproduced data (to be further discussed). DVD reproducing apparatus 100 further includes a control circuit 301 which transmits the error corrected digital signal output by circuit 4 on bus 300 in accordance with the IEEE-1394 standard. In addition to supplying the error corrected digital video/audio signal to MPEG decoder 6, error correction and memory control circuit 4 supplies the error corrected digital video/audio signal to bit rate detecting block 8. Bit rate detecting block 8 detects the bit rate of the output signal in accordance with, for example, the flow chart shown in FIG. 6. Referring to FIG. 6, bit rate detecting block 8 detects the occurrence of a packet header at inquiry 1, and if a packet header is detected, the number of packets that have been previously detected (N) is incremented by 1 (i.e., N=N+1) at instruction 2. If, however, a packet header is not detected at inquiry 1, then bit rate detecting block 8 performs no function, that is, waits until a packet header is detected. After incrementing the number of detected packets at instruction 2, it is determined, at inquiry 3, whether a countdown timer has reached a null (or 0) value (to be discussed) and instructions 4 through 7 are performed only if the countdown timer has reached its null value. The countdown timer initially is set for a period of 1 second and, thus, the number of detected packets that are received by bit rate detecting block 8 corresponds to the number of packets of data that are received during a period of one second. Accordingly, the bit rate is determined at instruction 4 by multiplying the number of bits in each packet of data (e.g., 2048 bytes per packet×8 bits per byte) by the number of detected packet headers (N). After the bit rate is detected, the countdown timer is reset to 1 second at instruction 5 and the detected number of packets N is reset to 0 at instruction 6. Finally, the calculated bit rate of the data (transmitted during a period of 1 second) is transmitted to control circuit 301 at instruction 7. Thus, bit rate detecting block 8 transmits the bit rate of the variable rate data every second. Of course, the bit rate can be detected and transmitted for a period other than every 1 second. Control circuit 301 calculates from the transmitted bit rate the number of units (previously discussed) that are required in accordance with the IEEE-1394 standard, and then the transmission band necessary to transmit the video/audio signal is "secured" also in accordance with the IEEE-1394 standard.

Figure 1:
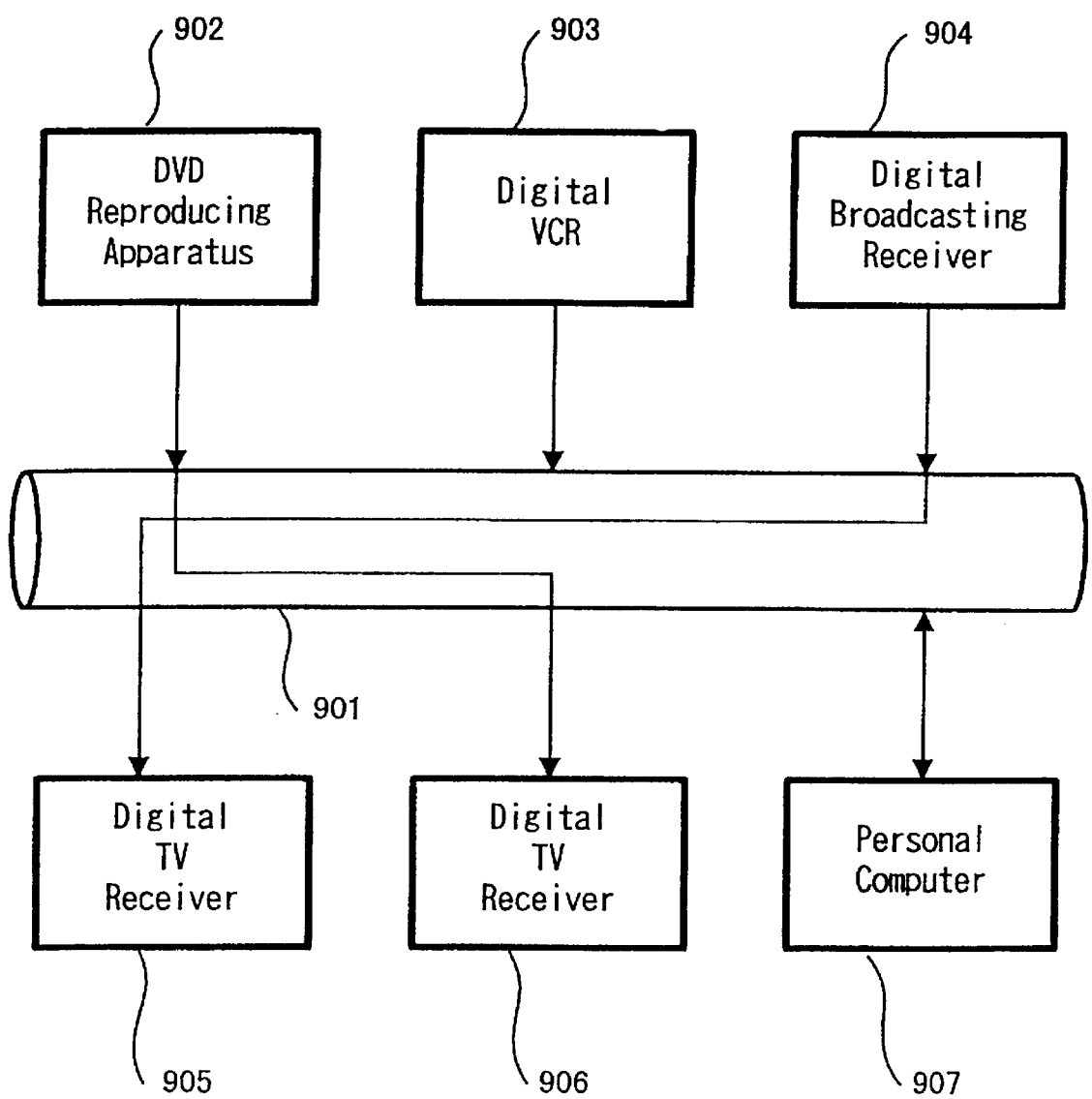
FIG. 1 is a block diagram of a system employing an IEEE-1394 digital serial bus.
Figure 9:
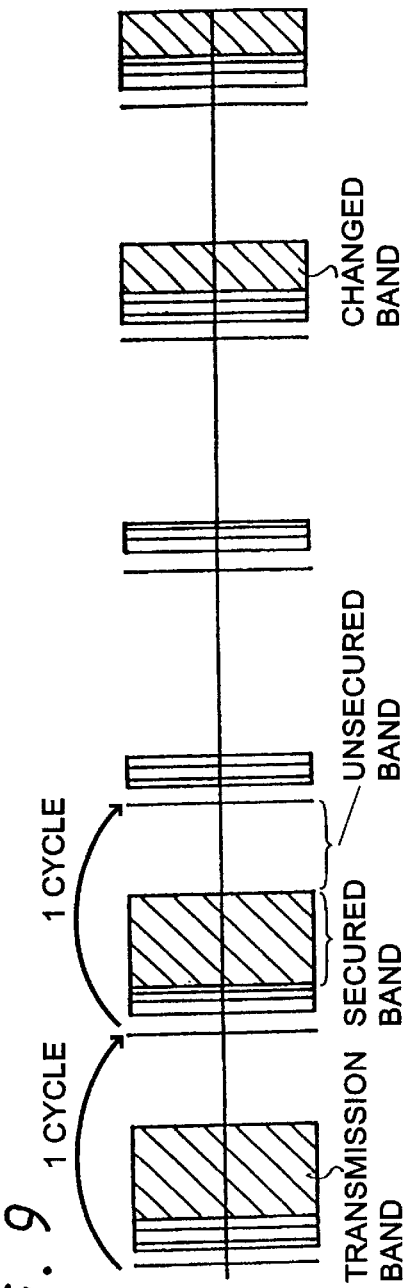
FIG. 9 is a schematic illustration of the transmission bandwidth of a digital serial bus that is transmitting data in accordance with the present invention.

Referring to FIG. 9, during each 125 μsec transmission cycle of the IEEE-1394 bus 300, a secured transmission band, represented by the hatched portions, is requested by control circuit 301 and such transmission band corresponds to the required number of units of data for the particular detected bit rate of that data. The hatched portion of each cycle shown in FIG. 9 therefore is "secured" for the data that is to be transmitted by DVD reproducing apparatus 100 of the present invention. The unsecured transmission band (i.e., the non-hatched portions) of each cycle is therefore usable by other devices, for example, digital VCR 903 shown in FIG. 1.

Control circuit 301 secures the necessary transmission band for each cycle and subsequently transmits the digital signal supplied from error correction and memory control circuit 4 on the secured transmission band of bus 300. The digital signal is transmitted to a control circuit 302 which operates to control the bus communication in accordance with the IEEE-1394 standard, which control circuit 302 being included in, for example, a digital television receiver 200 that includes an MPEG decoder 9. Therefore, and in accordance with the present invention, variable bit rate data reproduced by DVD reproducing apparatus 100 is transmitted on a digital serial bus in accordance with the IEEE-1394standard.

The transmitted video/audio data is supplied from control circuit 302 to MPEG decoder 9 which has a structure similar to that of MPEG decoder 6, but control circuits 92, 93 do not produce control signals that identify the storage state of memories 94, 95. The digital video/audio signal is supplied to a demultiplexer 91 which demultiplexes the signal into its respective video and audio components which are then stored via control circuits 92 and 93 in random access memories 94 and 95, respectively. The respective digital and audio signals are decoded by control circuits 92 and 93 and the decoded video and audio signals are supplied as, for example, respective digital video and audio signals.

As previously mentioned, control circuits 92 and 93 do not generate control signals that identify the storage states of memories 94 and 95. DVD reproducing apparatus 100 operates to MPEG decode the reproduced signal in MPEG decoder 6 and simultaneously transmit the reproduced signal on bus 300. Since MPEG decoder 9 is equivalent to MPEG decoder 6, and since control circuits 62 and 63 generate respective control signals representing the storage states of memories 64 and 65, which in turn controls the reproduction of the data from the digital video disk, it is unnecessary for control circuits 92 and 93 to generate controls signals that identify the respective storage states of memories 94 and 95. In other words, the storage states of memories 64 and 65 should be substantially equivalent to the storage states of memories 94 and 95, respectively and, thus, proper control of the reproduction of the digital video/audio data from the digital video disk is provided solely by MPEG decoder 6.

Figure 4:
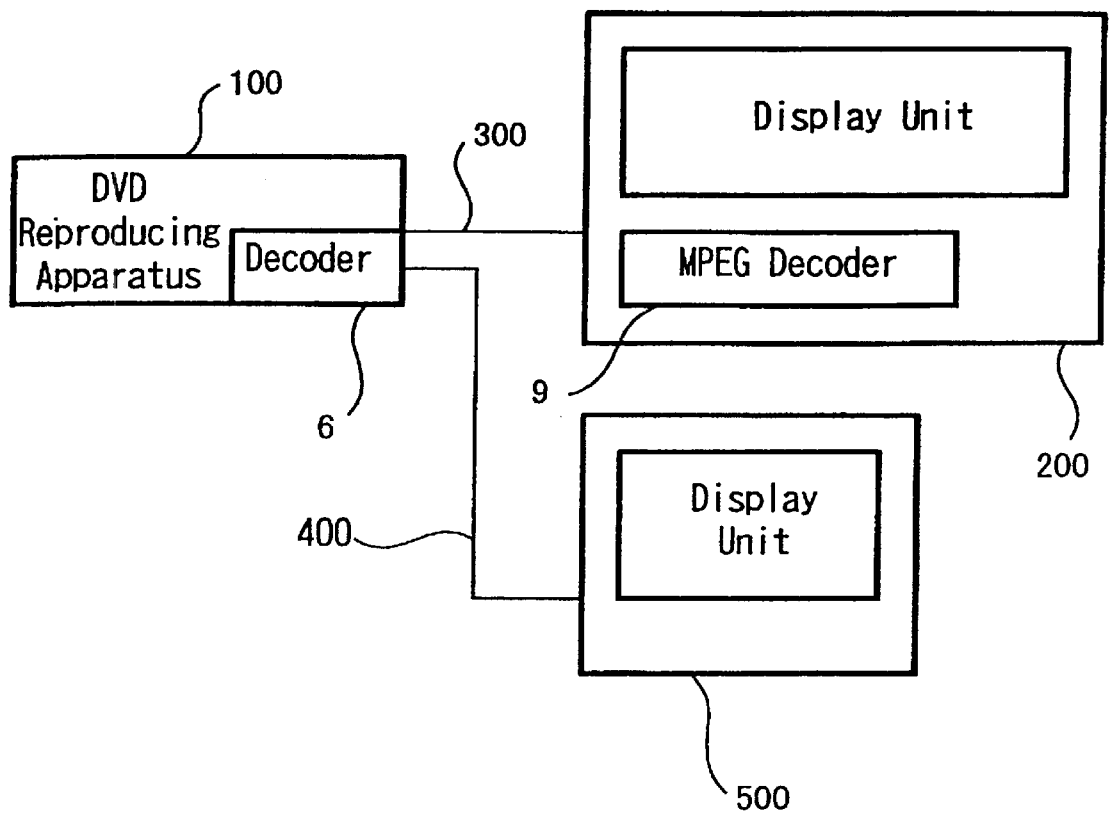
FIG. 4 is a simplified block diagram of the device shown in FIG. 2.

As previously mentioned, MPEG decoder 6 may supply as outputs respective analog video and audio signals and such signals may be supplied on an analog signal line 400 to an analog television receiver 500, such as shown in FIG. 4.

In accordance with the present invention, as discussed above, the storage states of memories 64 and 65 are detected and the reproduction operation of DVD reproducing apparatus 100 is controlled in accordance with such storage states thus preventing underflow and overflow of memories 64 and 65. By the use of MPEG decoder 6, a separate MPEG decoder 9, that is coupled to DVD reproducing apparatus 100 of the present invention via digital serial bus 300, does not need to determine whether an underflow or overflow condition of memories 94 and 95 exists. Furthermore, by detecting the bit rate of the supplied digital video/audio signal periodically in bit rate detecting block 8, variable rate data may be transmitted on a digital serial bus in accordance with the IEEE-1394 standard, even when such standard requires that the transmitted bit rate be known.

Figure 5:
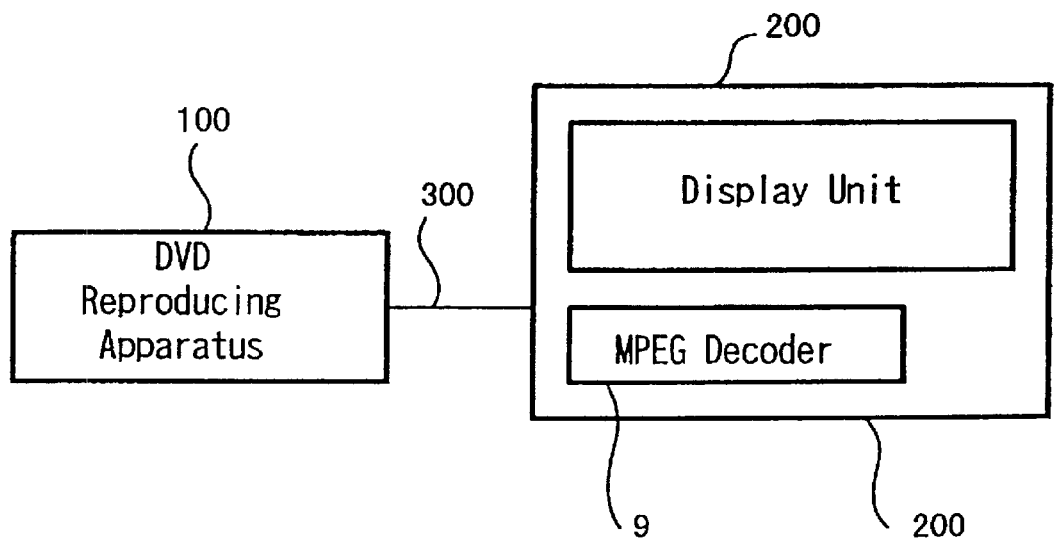
FIG. 5 is a simplified block diagram of the device shown in FIG. 3.

Referring next to FIG. 3 of the drawings, a block diagram of apparatus for transmitting digital video and audio data in accordance with another embodiment of the present invention is shown. FIG. 5 also illustrates the present embodiment, wherein DVD reproducing apparatus 100 is coupled to a digital television 200 including therein a display unit and MPEG decoder 9. Referring back to FIG. 3, DVD reproducing apparatus 100 includes a DVD reproducing device 1, an amplifier 2, a demodulator 3, an error correction and memory control circuit 4, a random access memory 5, a bit rate detecting block 8, a system control circuit 7 and a control circuit 301 and thus is similar to DVD reproducing apparatus 100 shown in FIG. 2, except the DVD reproducing device of the present embodiment does not include an internal MPEG decoder 6. In the present embodiment, circuits 1–5 operate in a manner identical to that of circuits 1–5 shown in FIG. 2, wherein digital video/audio data is reproduced from a digital video disk, demodulated, stored in memory 5, error corrected in circuit 4 and supplied as an error corrected digital video/audio signal to control circuit 301 via bit rate detecting block 8. Bit rate detecting block 8 operates in the same manner as that described above with respect to the embodiment shown in FIG. 2 (in accordance with the flow chart shown in FIG. 6) and, therefore, further description thereof is omitted herein. Also, like the embodiment shown in FIG. 2, control circuit 301 shown in FIG. 3 secures the necessary bandwidth in accordance with the bit rate detected by bit rate detecting block 8 and transmits on bus 300 the error corrected digital video/audio signal in accordance with the IEEE-1394 standard, all as previously discussed.

The transmitted digital video/audio signal is supplied to a control circuit 302 included in digital television receiver 200 which supplies the received signal to an MPEG decoder 9 which includes therein a demultiplexer 91, control circuits 92 and 93, and memories 94 and 95. Demultiplexer 91 demultiplexes the transmitted signal into its respective video and audio components, and stores the video data via control circuit 92 in memory 94 and stores the audio data via control circuit 93 in memory 95. Control circuits 92 and 93 MPEG decode the respective video and audio data to produce respective digital video and audio signals.

In accordance with the present invention, control circuits 92 and 93 detect the storage states (conditions) of memories 94 and 95, respectively (like control circuits 62 and 63 in FIG. 2) and generate therefrom respective control signals that are supplied to control circuit 302. Also in accordance with the present invention, the control signals supplied from control circuits 92 and 93 to control circuit 302 are transmitted from control circuit 302 on digital serial bus 300 to control circuit 301 in DVD reproducing apparatus 100.

Figure 7:
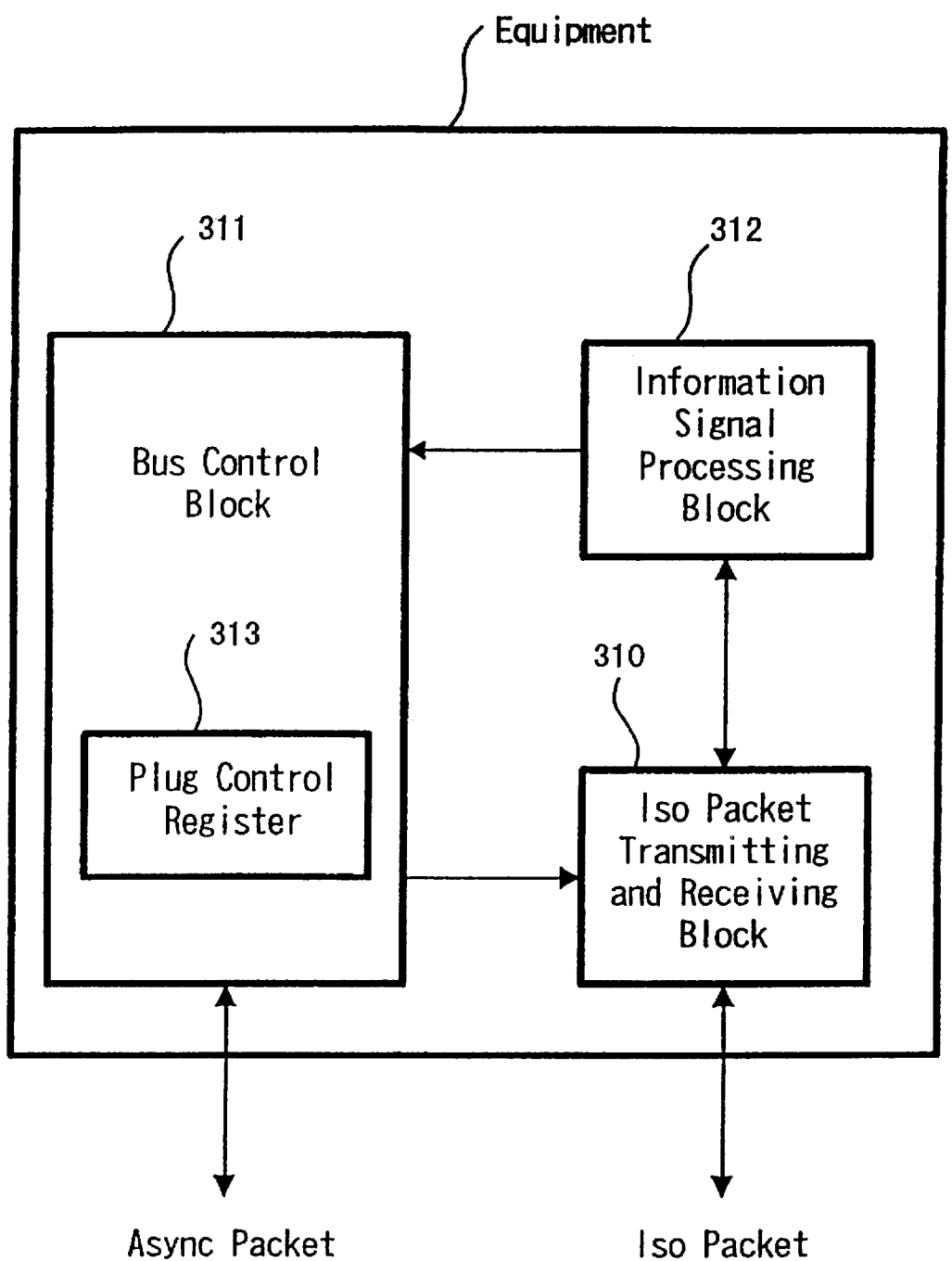
FIG. 7 is a block diagram of control circuits 301 and 302 in accordance with the present invention.

In accordance with the IEEE-1394 standard, control circuits 301 and 302 each have a block structure as shown in FIG. 7, wherein each control circuit includes an Iso packet transmitting and receiving block 310, a bus control block 311, an information signal processing block 312 and a plug control register 313 located within bus control block 311. Iso packet transmitting and receiving block 310 performs isochronous communication for transmitting the video signal data and audio signal data, and bus control block 311 performs asynchronous communication for transmitting control signals. Data is transmitted between the Iso packet transmitting and receiving block 310 and information signal processing block 312 within each control circuit 301 and 302. In accordance with the IEEE-1394 standard, the Iso packet that is transmitted between control circuit 301 and 302 has the data structure as shown in FIG. 8.

Figure 8:
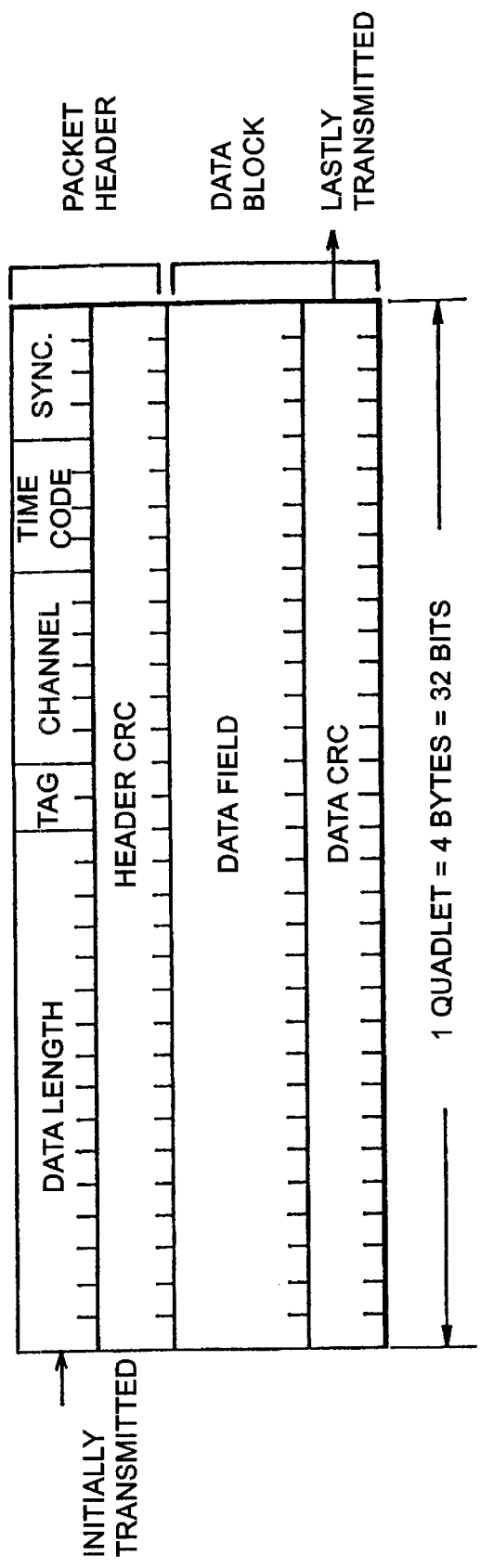
FIG. 8 schematically illustrates the data structure of an Iso packet.

Referring to FIG. 8, each Iso packet is formed from "quadlets" of data, each quadlet consisting of four bytes of information. The Iso packet includes a header, which includes therein the data length that is provided in the so-called first quadlet. The Iso packet further includes in the second quadlet cyclic redundancy check (CRC) codes for the information of the first quadlet. As shown, the packet header is comprised of the first and second quadlets, such packet header being transmitted at the beginning of packet transmission. A data field follows the packet header, and the cyclic redundancy check codes for the data field follows that data field.

Bus control block 311 of each control circuit 301 and 302 receives from the respective information processing block 312 the control signals that identify the storage states of memories 94 and 95. Such information is transmitted from one control circuit to another control circuit utilizing asynchronous communication. Typically, control circuit 302 transmits such control signals asynchronously to control circuit 301 which subsequently supplies the transmitted control signals to system control circuit 7. As previously mentioned, bus control block 311 of each control circuit 301, 302 includes a respective plug control register 313. Plug control register 313 sets values stored therein in accordance with the transmitted information, for example, the transmitted signals, and the various information generated by the particular equipment utilized, and Iso packet transmitting and receiving block 310 of the respective control circuit 301, 302 is controlled in accordance with the values stored in plug control register 313.

Finally, the control signals transmitted to system control circuit 7 from control 301 operate to control the reproducing operation of DVD reproducing circuit 1 in order to prevent underflow and overflow of memories 94 and 95.

Like the first embodiment previously discussed with reference to FIG. 2, the embodiment of FIG. 3 is operable to transmit variable rate data across a transmission line, for example, IEEE-1394 bus 300, which has a predetermined rate of transmission. Referring again to FIG. 9, the secured transmission band changes every cycle (or perhaps every other or every third cycle, etc.), such secured band being determined from the detected bit rate of the digital signal.

While the present invention has been particularly shown and described in conjunction with preferred embodiments thereof, it will be readily appreciated by those of ordinary skill in the art that various changes may be made without departing from the spirit and scope of the invention. For example, the present invention, although described with reference to the IEEE-1394 standard and the use of MPEG decoders, is not limited to this standard and/or the use of MPEG decoders, but may be applied to other standards and/or other types of coders/decoders that produce/decode variable-rate data.

Therefore, it is intended that the appended claims be interpreted as including the embodiments described herein, the alternatives mentioned above, and all equivalents thereto.

What is claimed is:

1. Apparatus for transmitting variable rate data on a transmission line requiring a predetermined rate, comprising:
   detection means for detecting a data rate of variable rate data at predetermined intervals of time;
   means for establishing a transmission rate of said variable rate data in accordance with the detected data rate, said detected data rate is transmitted at predetermined intervals of time; and
   means for transmitting said variable rate data on said transmission line in accordance with the established transmission rate.

2. The apparatus of claim 1, wherein said means for establishing includes means for securing a bandwidth of said transmission line required to transmit said variable rate data having said detected data rate.

3. The apparatus of claim 2, wherein said transmission line has a plurality of cycles, and said detection means is operable to detect the data rate of said variable rate data to be transmitted during each of said cycles.

4. The apparatus of claim 3, wherein said means for securing a bandwidth is operable to secure a new bandwidth for each cycle of said transmission line in accordance with the detected data rate of said variable rate data to be transmitted during the respective cycle.

5. Apparatus for transmitting variable rate data on a transmission line having a predetermined rate, comprising:
   means for controlling the reproducing of a signal from a record medium in accordance with a control signal to produce a variable rate signal;
   detection means for detecting a data rate of variable rate data at predetermined intervals of time;
   means for establishing a transmission rate of said variable rate data in accordance with the detected data rate, said detected data rate is transmitted at predetermined intervals of time; and
   processing means for processing the produced variable rate signal, said processing means including means for generating said control signal in accordance with a condition of processing of the produced variable rate signal by said processing means; and
   transmitting means for transmitting the variable rate signal on said transmission line in accordance with the established transmission rate.

6. The apparatus of claim 5, wherein said processing means is operable to MPEG decode the produced variable rate signal.

7. The apparatus of claim 5, wherein said processing means includes buffering means for buffering the produced variable rate signal, and said means for generating said control signal generates said control signal representing a state of said buffering means.

8. The apparatus of claim 5, further comprising reception means for receiving the variable rate signal transmitted on said transmission line, said reception means including reception processing means for processing the received transmitted variable rate signal in a similar manner as said processing means processes the produced variable rate signal, said reception processing means not generating a control signal that controls the reproduction of the signal from the record medium.

9. The apparatus of claim 8, wherein said processing means and said reception processing means are both MPEG decoders.

10. Apparatus for transmitting variable rate data on a transmission line having a predetermined rate, comprising:
   means for controlling the reproducing of a signal from a record medium in accordance with a control signal to produce a variable rate signal, wherein a data rate of said variable rate signal is transmitted at predetermined intervals of time;
   detection means for detecting a data rate of variable rate data at predetermined intervals of time;
   means for establishing a transmission rate of said variable rate data in accordance with the detected data rate, said detected data rate is transmitted at predetermined intervals of time; and
   transmitting means for transmitting the variable rate signal on said transmission line in accordance with the established transmission rate; and
   reception means for receiving the variable rate signal transmitted on said transmission line, said reception means including reception processing means for processing the received transmitted variable rate signal, said reception processing means including means for generating said control signal in accordance with a condition of processing of the received transmitted variable rate signal by said reception processing means, said reception means further including reception transmitting means for transmitting the generated control signal to said transmitting means;

wherein said transmitting means is operable to receive the transmitted control signal and to supply the received transmitted control signal to said means for controlling.

11. The apparatus of claim 10, wherein said reception processing means includes buffering means for buffering the received transmitted variable rate signal, and said means for generating said control signal generates said control signal representing a state of said buffering means.

12. The apparatus of claim 11, wherein said reception processing means is an MPEG decoder.

13. Apparatus for transmitting variable rate data on a transmission line requiring a predetermined rate, comprising:

a bit rate detector for detecting a data rate of variable rate data at predetermined intervals of time; and a bus controller for establishing a transmission rate of said variable rate data in accordance with the detected data rate, and for transmitting said variable rate data on said transmission line in accordance with the established transmission rate, wherein said detected data rate is transmitted at predetermined intervals of time.

14. The apparatus of claim 13, wherein said bus controller is operable to secure a bandwidth of said transmission line required to transmit said variable rate data having said detected data rate.

15. The apparatus of claim 14, wherein said transmission line has a plurality of cycles, and said bit rate detector is operable to detect the data rate of said variable rate data to be transmitted during each of said cycles.

16. The apparatus of claim 15, wherein said bus controller is further operable to secure a new bandwidth for each cycle of said transmission line in accordance with the detected data rate of said variable rate data to be transmitted during the respective cycle.

17. Apparatus for transmitting variable rate data on a transmission line having a predetermined rate, comprising:

a reproducing device controller for controlling the reproducing of a signal from a record medium in accordance with a control signal to produce a variable rate signal;

detection means for detecting a data rate of variable rate data at predetermined intervals of time;

means for establishing a transmission rate of said variable rate data in accordance with the detected data rate, said detected data rate is transmitted at predetermined intervals of time; and a processor for processing the produced variable rate signal, said processor being operable to generate said control signal in accordance with a condition of processing of the produced variable rate signal by said processor; and a transmission line controller for transmitting the processed, produced variable rate signal on said transmission line in accordance with the established transmission rate.

18. The apparatus of claim 17, wherein said processor is an MPEG decoder.

19. The apparatus of claim 17, wherein said processor includes a data buffer for buffering the produced variable rate signal, and said control signal generated by said processor represents a state of said data buffer.

20. The apparatus of claim 17, further comprising a receiver for receiving the variable rate signal transmitted on said transmission line, said receiver including a reception processor for processing the received transmitted variable rate signal in a similar manner as said processor process the produced variable rate signal, said reception processor generating a control signal that controls the reproduction of the signal from the record medium.

21. The apparatus of claim 20, wherein said processor and said reception processor are both MPEG decoders.

22. Apparatus for transmitting variable rate data on a transmission line having a predetermined rate, comprising:

a reproducing device controller for controlling the reproducing of a signal from a record medium in accordance with a control signal to produce a variable rate signal;

detection means for detecting a data rate of variable rate data at predetermined intervals of time;

means for establishing a transmission rate of said variable rate data in accordance with the detected data rate, said detected data rate is transmitted at predetermined intervals of time; and a transmitter for transmitting the variable rate signal on said transmission line in accordance with the established transmission rate; and a receiver for receiving the variable rate signal transmitted on said transmission line, said receiver including a reception processor for processing the received transmitted variable rate signal, said reception processor generating said control signal in accordance with a condition of processing of the received transmitted variable rate signal by said reception processor, said receiver further being operable to transmit the generated control signal to said transmitter;

wherein said transmitter is operable to receive the transmitted control signal and to supply the received transmitted control signal to said reproducing device controller.

23. The apparatus of claim 22, wherein said reception processor includes a data buffer for buffering the received transmitted variable rate signal, and said control signal generated by said reception processor represents a state of said data buffer.

24. The apparatus of claim 23, wherein said reception processor is an MPEG decoder.

25. Method of transmitting variable rate data on a transmission line requiring a predetermined rate, comprising the steps of:

detecting a data rate of variable rate data at predetermined intervals of time;

establishing a transmission rate of said variable rate data in accordance with the detected data rate, said detected data rate is transmitted at predetermined intervals of time; and transmitting said variable rate data on said transmission line in accordance with the established transmission rate.

26. The method of claim 25, wherein said step of establishing is carried out by securing a bandwidth of said transmission line required to transmit said variable rate data having said detected data rate.

27. The method of claim 26, wherein said transmission line has a plurality of cycles, and said detecting step is carried out by detecting the data rate of said variable rate data to be transmitted during each of said cycles.

28. The method of claim 27, wherein said step of securing a bandwidth is carried out by securing a new bandwidth for each cycle of said transmission line in accordance with the detected data rate of said variable rate data to be transmitted during the respective cycle.

29. Method of transmitting variable rate data on a transmission line having a predetermined rate, comprising the steps of:

controlling the reproducing of a signal from a record medium in accordance with a control signal to produce a variable rate signal;

detecting a data rate of variable rate data at predetermined intervals of time;

establishing a transmission rate of said variable rate data in accordance with the detected data rate, said detected data rate is transmitted at predetermined intervals of time; and processing the produced variable rate signal;

generating said control signal in accordance with a condition of processing of the produced variable rate signal; and transmitting the variable rate signal on said transmission line in accordance with the established transmission rate.

30. The method of claim 29, wherein said processing step is carried out by MPEG decoding the produced variable rate signal.

31. The method of claim 29, wherein said processing step includes the step of buffering the produced variable rate signal in a buffer, and said generated control signal represents a state of said buffer.

32. The method of claim 29, further comprising the steps of receiving the variable rate signal transmitted on said transmission line, and processing the received transmitted variable rate signal in a similar manner as said variable rate signal is processed in said first processing step, wherein a control signal representing a condition of processing of the received transmitted variable rate signal similar to the previously generated control signal is not generated.

33. The method of claim 32, wherein said first and second processing steps are carried by respective MPEG decoders.

34. Method of transmitting variable rate data on a transmission line having a predetermined rate, comprising the steps of:

controlling the reproducing of a signal from a record medium in accordance with a control signal to produce a variable rate signal;

detecting a data rate of variable rate data at predetermined intervals of time;

establishing a transmission rate of said variable rate data in accordance with the detected data rate, said detected data rate is transmitted at predetermined intervals of time; and transmitting from a transmission side the variable rate signal on said transmission line in accordance with the established transmission rate;

receiving the variable rate signal transmitted on said transmission line;

processing the received transmitted variable rate signal;

generating said control signal in accordance with a condition of processing of the received transmitted variable rate signal;

transmitting the generated control signal on said transmission line; and receiving at said transmission side the transmitted control signal;

wherein the received transmitted control signal is utilized to control the reproducing by said controlling step.

35. The method of claim 34, wherein said processing step includes the step of buffering the received transmitted variable rate signal in a buffer, and the generated control signal represents a state of said buffer.

36. The method of claim 35, wherein said processing step is carried out by an MPEG decoder.

37. Apparatus for transmitting variable rate data on a transmission line requiring a predetermined rate, comprising:

a detection circuit;

a transmission rate circuit coupled to said detection circuit; and a transmitting circuit coupled to said transmission rate circuit;

wherein said detection circuit detects a data rate of variable rate data at predetermined intervals of time;

wherein said transmission rate circuit establishes a transmission rate of said variable rate data in accordance with the detected data rate, said detected data rate is transmitted at predetermined intervals of time; and wherein said transmitting circuit transmits said variable rate data on said transmission line in accordance with the established transmission rate.

38. The apparatus of claim 37, wherein said transmission rate circuit includes a bandwidth circuit which secures a bandwidth of said transmission line required to transmit said variable rate data having said detected data rate.

39. The apparatus of claim 38, wherein said transmission line has a plurality of cycles, and said detection circuit is operable to detect the data rate of said variable rate data to be transmitted during each of said cycles.

40. The apparatus of claim 39, wherein said bandwidth circuit is operable to secure a new bandwidth for each cycle of said transmission line in accordance with the detected data rate of said variable rate data to be transmitted during the respective cycle.

41. Apparatus for transmitting variable rate data on a transmission line having a predetermined rate, comprising:

a control circuit;

detection means for detecting a data rate of variable rate data at predetermined intervals of time;

means for establishing a transmission rate of said variable rate data in accordance with the detected data rate, said detected data rate is transmitted at predetermined intervals of time; and a processing circuit coupled to said control circuit and including a generating circuit; and a transmitting circuit;

wherein said control circuit controls the reproducing of a signal from a record medium in accordance with a control signal to produce a variable rate signal;

wherein said processing circuit processes the produced variable rate signal and said generating circuit generates said control signal in accordance with a condition of processing of the produced variable rate signal by said processing circuit; and wherein said transmitting circuit transmits the variable rate signal on said transmission line in accordance with the established transmission rate in accordance with the established transmission rate.

42. The apparatus of claim 41, wherein said processing circuit is operable to MPEG decode the produced variable rate signal.

43. The apparatus of claim 41, wherein said processing circuit includes a buffering circuit which buffers the produced variable rate signal, and wherein said control signal generated by said generating circuit represents a state of said buffering circuit.

44. The apparatus of claim 41, further comprising a reception circuit which receives the variable rate signal transmitted on said transmission line, said reception circuit includes a reception processing circuit which processes the received transmitted variable rate signal in a similar manner as said processing circuit processes the produced variable rate signal, said reception processing circuit not generating a control signal that controls the reproduction of the signal from the record medium.

45. The apparatus of claim 44, wherein said processing circuit and said reception processing circuit are both MPEG decoders.

46. Apparatus for transmitting variable rate data on a transmission line having a predetermined rate, comprising:

a control circuit;

detection means for detecting a data rate of variable rate data at predetermined intervals of time;

means for establishing a transmission rate of said variable rate data in accordance with the detected data rate, said detected data rate is transmitted at predetermined intervals of time; and a transmitting circuit coupled to said control circuit; and a reception circuit coupled to said transmission line;

wherein said control circuit controls the reproducing of a signal from a record medium in accordance with a control signal to produce a variable rate signal;

wherein said transmitting circuit transmits the variable rate signal on said transmission line;

wherein said reception circuit receives the variable rate signal transmitted on said transmission line and includes a reception processing circuit which processes the received transmitted variable rate signal, said reception processing circuit includes a generating circuit which generates said control signal in accordance with a condition of processing of the received transmitted variable rate signal by said reception processing circuit, said reception circuit further includes a reception transmitting circuit which transmits the generated control signal to said transmitting circuit; and wherein said transmitting circuit is operable to receive the transmitted control signal and to supply the received transmitted control signal to said control circuit.

47. The apparatus of claim 46, wherein said reception processing circuit includes a buffering circuit which buffers the received transmitted variable rate signal, and wherein said control signal generated by said generating circuit represents a state of said buffering circuit.

48. The apparatus of claim 47, wherein said reception processing circuit is an MPEG decoder.

* * * * *